United States Patent [19]
Daniel

[11] Patent Number: 5,272,931
[45] Date of Patent: Dec. 28, 1993

[54] TRANSMISSION SHIFT CONTROL MECHANISM

[75] Inventor: Timothy Daniel, Kalamazoo, Mich.
[73] Assignee: Eaton Corporation, Cleveland, Ohio
[21] Appl. No.: 951,528
[22] Filed: Sep. 25, 1992
[51] Int. Cl.$^5$ ............................................. F16H 59/04
[52] U.S. Cl. .................................. 74/473 R; 267/150
[58] Field of Search ................. 74/473 R, 475, 476, 74/477; 267/150

[56] References Cited

U.S. PATENT DOCUMENTS

| | | | |
|---|---|---|---|
| 2,684,600 | 7/1954 | Naumann | 74/477 |
| 3,264,895 | 8/1966 | Turunen | 74/477 |
| 3,934,485 | 1/1976 | Ratliff | 74/473 R |
| 4,550,627 | 11/1985 | Lauer et al. | 74/475 |
| 4,567,785 | 2/1986 | Reynolds et al. | 74/477 |
| 4,581,951 | 4/1986 | Watson | 74/473 R |
| 4,584,895 | 4/1986 | Holmes | 74/476 |
| 4,676,115 | 6/1987 | Morscheck et al. | 74/339 |
| 4,892,001 | 1/1990 | Meyers et al. | 74/475 X |

*Primary Examiner*—Allan D. Herrmann
*Attorney, Agent, or Firm*—L. J. Kasper

[57] ABSTRACT

A shift control mechanism (41) is provided for use in cooperation with a transmission shift bar housing assembly (11) to be mounted on a transmission having a plurality of shift rails (17,19,21,23) of the type wherein movement of the shift lever in the Y—Y direction results in axial movement of one of the shift rails, and engagement of a particular transmission gear ratio. The shift control mechanism includes a support member (43) and a slide member (45) restrained from movement only in the X—X direction relative to the support member, and in engagement with a shift finger (33). The support member and slide member define spring openings (53,55,73,75), which receive compression springs. When the slide member (45) is in a neutral position (FIG. 1) in the X—X direction, the compression springs are at minimum load; movement of the slide member toward a first displaced position (FIG. 4) further loads a first spring (57); and further movement of the slide member toward a second position (FIG. 6) further loads the second spring (59).

12 Claims, 5 Drawing Sheets

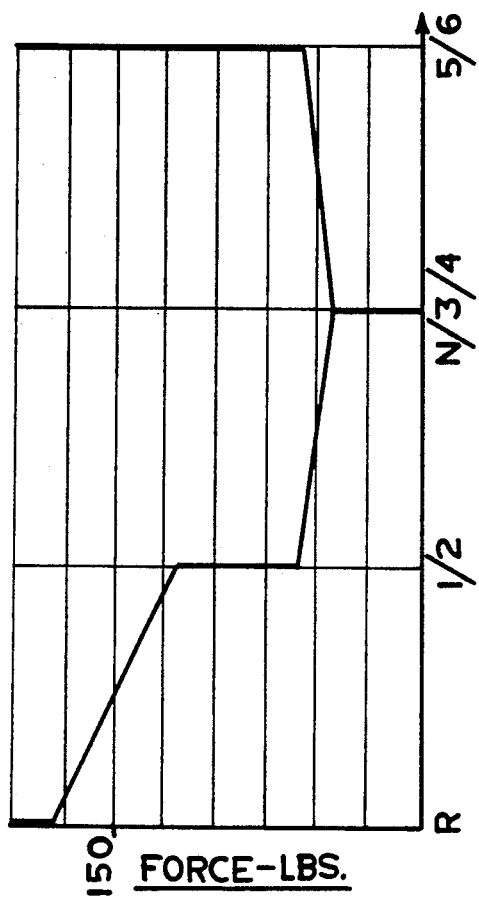
FIG. 8
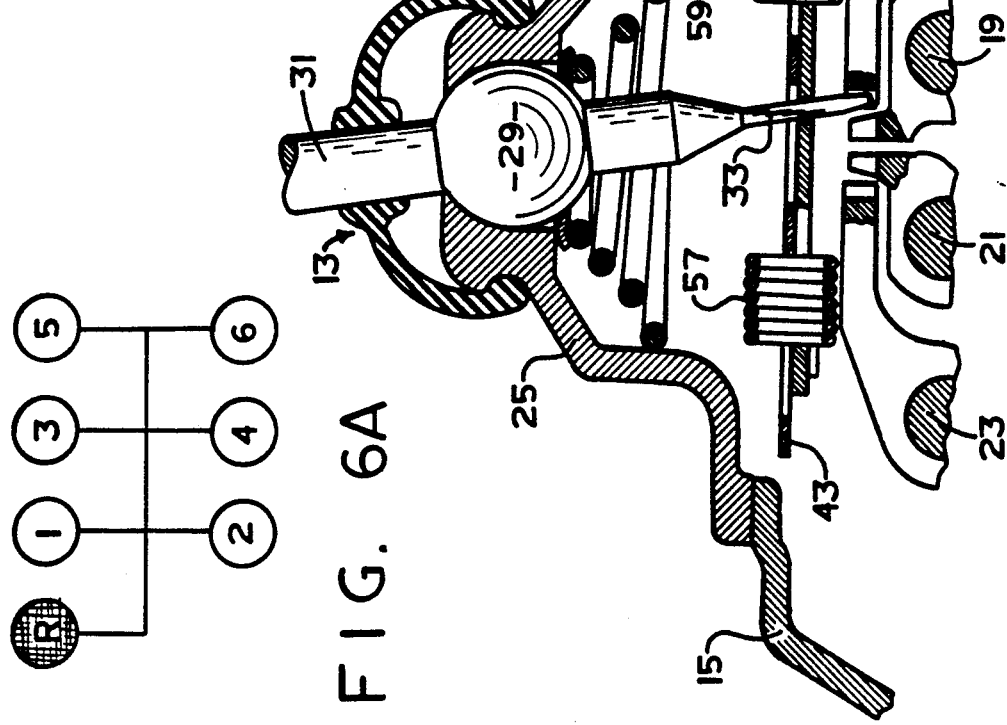
FIG. 6A
FIG. 6

TRANSMISSION SHIFT CONTROL MECHANISM

BACKGROUND OF THE DISCLOSURE

The present invention relates to transmission shift control mechanisms, also commonly referred to as gear selector mechanisms, for use with transmission shift bar assemblies. More particularly, the present invention relates to a rail selection indication module for use with a shift control mechanism.

Mechanisms for providing the vehicle operator with a "feel" for verification of proper shift rail selection, when manually shifting a gear shift lever of a mechanical transmission by use of resilient, yieldable means are known in the prior art as may be seen by reference to U.S. Pat. Nos. 3,934,485; 4,022,078; and 4,567,785, all of which are incorporated herein by reference. Although such prior art mechanisms are suitable for certain purposes, they tend to be complicated and expensive to manufacture, assemble, and service. Some such mechanisms also do not provide the operator with a positive indication of correct rail selection in a shift bar housing assembly having 3, 4, or more shift rails. Furthermore, some of the prior art rail selection indication mechanisms are not operable, for either direction of shift lever movement, from a neutral or minimum-force position.

SUMMARY OF THE INVENTION

Accordingly, it is an object of the present invention to provide an improved transmission shift control mechanism, preferably for use with a shift bar housing assembly, and furthermore, to provide a shift rail selection indication module which overcomes the problems described in connection with the prior art.

It is a more specific object of the present invention to provide such a selection indication module which may easily be added to a conventional shift control mechanism without adding substantial structure or machining of various housings, and which is relatively simple in construction and requires relatively few parts.

It is another object of the present invention to provide such an improved rail selection indication module which is operable, for either direction of shift lever movement, from a minimum force position.

It is still another object of the present invention to provide such an improved rail selection indication module wherein, as the shift lever is moved from one position to the next, the vehicle operator feels a very definite increase in resistance to further movement of the shift lever.

The above and other objects of the invention are accomplished by the provision of a shift control mechanism for use in cooperation with a transmission shift bar housing assembly comprising a shift bar housing mountable to a transmission housing, and a plurality of substantially parallel, generally equal transverse width shift rails mounted for selected axial movement within the shift bar housing. Each of the shift rails is operatively connected to shift elements for engaging and disengaging selected transmission gears. Each of the shift rails has an axially non-displaced neutral position, and an axially displaced in-gear position. Each of the shift rails includes means adapted for operative engagement with a shift finger associated with a shift lever, whereby movement of the shift lever in the Y—Y direction results in axial movement of one of the shift rails.

The improved shift control mechanism is characterized by a support member fixed relative to the shift bar housing and defining first and second spring seats. A slide member is operatively associated with the support member, movable relative thereto, and restrained for movement substantially only in the X—X direction, the slide member defining first and second spring seats. A first compression spring has its opposite ends seated relative to the first spring seats of the support member and the slide member, respectively. A second compression spring has its opposite ends seated relative to the second spring seats of the support member and the slide member, respectively. The first spring seats and the second spring seats are located, relative to each other, such that, when the slide member is in a neutral position, in the X—X direction, the first and second compression springs are at a minimum load. As the slide member is displaced from the neutral position toward a first displaced position, the first compression spring is further loaded. As the slide member is displaced from the first position to a second displaced position, the second compression spring is further loaded.

BRIEF DESCRIPTION OF THE DRAWINGS

FIG. 1A is a schematic representation of the shift pattern, highlighted to correspond to the shift lever position shown in FIG. 1.

FIG. 6 is an axial cross-section, similar to FIGS. 1 and 4, but with the shift control mechanism of the present invention in reverse gear position.

FIG. 6A is a schematic representation of the shift pattern, highlighted to correspond to the shift lever position shown in FIG. 6.

FIG. 8 is a graph of force versus X—X position of the shift lever.

DESCRIPTION OF THE PREFERRED EMBODIMENT

Multi-speed change-gear transmissions of both the sliding gear type and the sliding clutch type are well known in the prior art, and examples thereof may be seen by reference to above-incorporated U.S. Pat. Nos. 3,387,501; 4,273,004; and 4,296,642. By "sliding gear type" it is meant those wherein selected gears are moved into meshing engagement with other gears, and by "sliding clutch type" it is meant those wherein constantly meshed gears are selectively clutched to a shaft by means of an axially slidable clutch.

In transmissions of either of the types described above, the slidable member (gear or clutch) is provided with a groove in which a shift fork or shift yoke (or other shifting element) is received for imparting a selected axial movement thereto. The shift forks or yokes are typically carried by, or at least selectively axially moved by, an axially movable shift rail or shift bar. The shift rail and shift fork carried thereby typically have an axially centered or non-displaced neutral position, and are axially movable therefrom in first and second opposite axial directions, to engage first and second selected gear ratios, respectively.

Figure 1:
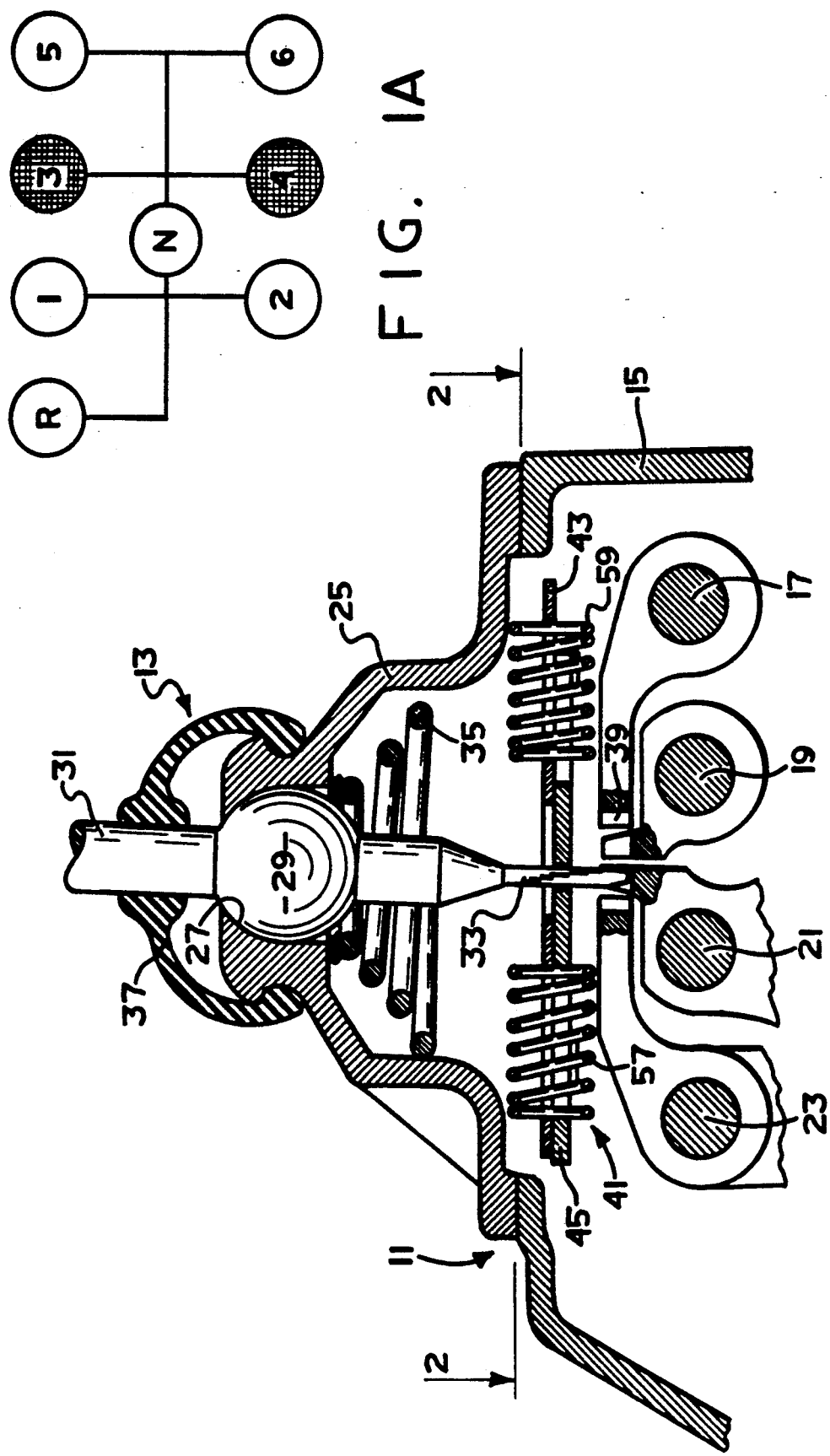
FIG. 1 is a fragmentary, axial cross-section of a shift control mechanism made in accordance with the present invention.

Accordingly, in transmissions of this type, one shift rail and one shift yoke are required for each pair of selectively engageable gears. Referring now primarily to FIG. 1, typically the transmission shifting mechanism includes a shift bar housing assembly, generally designated 11, mounted to the transmission (not shown herein), usually at the top of the transmission housing. Mounted on top of the shift bar housing assembly 11 is a shift tower, generally designated 13, which will be described in greater detail subsequently.

The shift bar housing assembly 11 includes a shift bar housing 15, and disposed therein are the various shift rails. By way of illustration only, and not limitation, the shift bar housing 15 encloses an assembly for utilization with a six forward speed and one reverse speed transmission, including four generally circular cross-section shift rails 17, 19, 21, and 23. The shift rail 17 is the reverse speed shift rail; the shift rail 19 is the first speed and second speed shift rail; the shift rail 21 is the third speed and fourth speed shift rail; and the shift rail 23 is the fifth speed and sixth speed shift rail. Typically, each of the shift rails carries a shift fork or shift yoke or shift block, which is either axially moved by the shift rail, or axially fixed to the shift rail, for movement therewith. As is generally well known to those skilled in the art, transmission shifting, or gear engagement, is accomplished by selective axial movement of a selected one of the shift rails, from a non-displaced, neutral position to an axially displaced in-gear position.

The construction and operation of shift rails, shift forks, etc. (which is not an essential feature of the present invention), may be better understood by reference to U.S. Pat. No. 4,550,627, assigned to the assignee of the present invention, and incorporated herein by reference.

Referring now to FIG. 1A, in conjunction with FIG. 1, it should be noted that the "neutral" position (N) of the transmission is shown on the horizontal line, and those skilled in the art will understand that, regardless of which shift rail is being selected (engaged) at any particular time, if that particular shift rail is in its centered, non-displaced position, the transmission will effectively be operating in neutral. However, as used subsequently herein, the term "neutral" will generally be used to indicate a minimum force or minimum feel position in the X—X direction (see FIG. 8), as will be described in greater detail subsequently.

The shift tower 13, which is also not an essential feature of the present invention, includes a tower housing 25, which may be attached to the shift bar housing 15 in any suitable manner. The housing 25 defines a generally spherical seat 27 which receives a spherical portion 29 of a shift lever, generally designated 31. The shift lever 31 includes a shift finger 33 which engages the particular shift rail being selected. The lower portion of the shift lever 31 is surrounded by a generally conical compression spring 35, which has its upper end seated against the spherical portion 29, to retain it against the seat 27 and, at the same time, provide some "shift feel" as the vehicle operator moves the shift lever 31. In engagement with both the upper end of the tower housing 25 and the upper portion of the shift lever 31 is a rubber boot 37, of a type generally well known in the art.

Referring still to FIG. 1, each of the shift rails 17 through 23 is operatively associated with either a shift yoke or a shift block, and each yoke or block defines a shift finger notch 39 (only one of which is so labelled in FIG. 1). The construction and function of such notches may be better understood by reference to above-incorporated U.S. Pat. No. 4,550,627.

Figure 2:
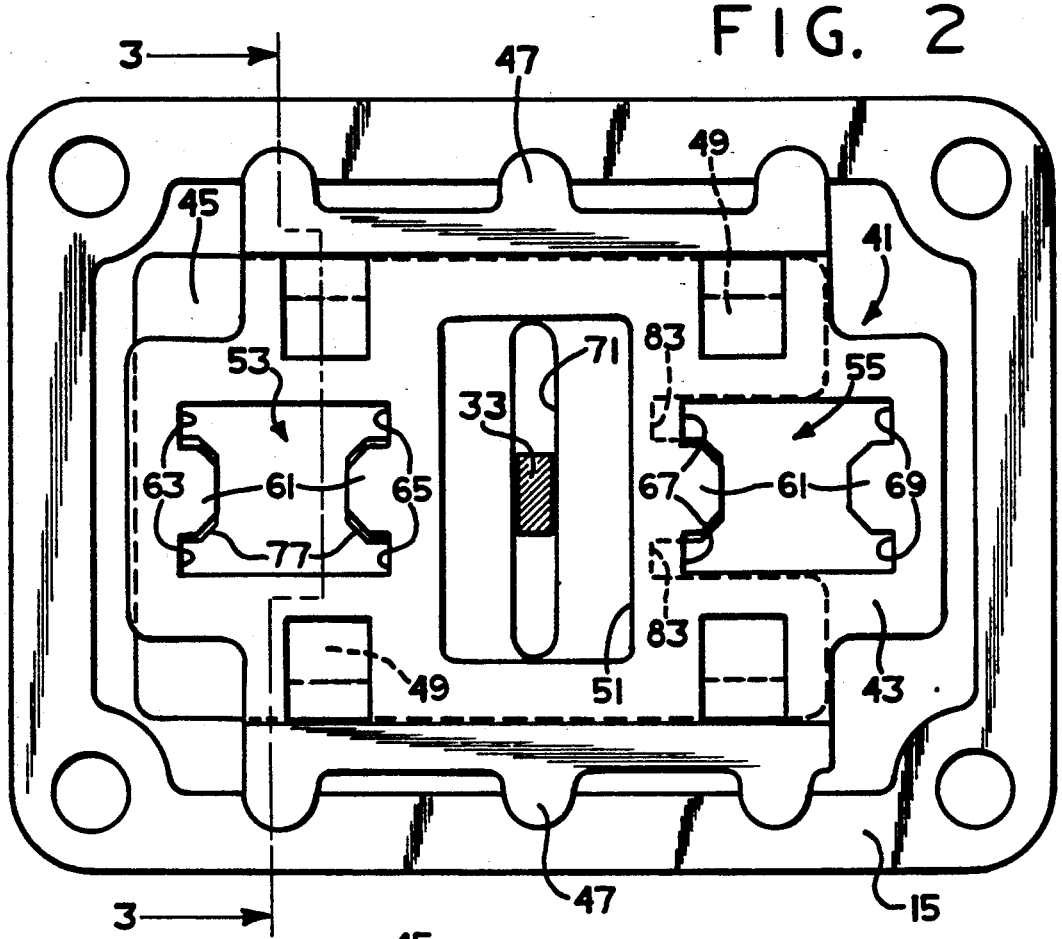
FIG. 2 is a horizontal transverse cross-section, taken on line 2—2 of FIG. 1, but on a larger scale.

Referring now primarily to FIG. 2, in conjunction with FIG. 1, the present invention provides a shift rail selection indication module, generally designated 41, which is received within the upper portion of the shift bar housing 15, and in turn, receives the shift finger 33. In general, the function of the selection indication module 41 is to apply a biasing force against the shift finger 33, which is felt by the vehicle operator as he moves the shift lever 31, with the biasing force varying with changes in the X—X position (from left to right, or right to left, in FIG. 2) of the shift finger 33, thus indicating to the vehicle operator which shift rail has been selected. The shift rail selection indication module 41 includes a support member 43, and a slide member 45 (shown by itself in FIG. 2A). Each of the members 43 and 45 may comprise a relatively simple, inexpensive stamping, although it should be understood that the particular configuration and method of fabrication of the member is not an essential feature of the invention, except as set forth hereinafter and in the appended claims.

The support member 43 includes a plurality of locating tabs 47, each of which is received in a corresponding recess in the upper surface of the shift bar housing 15. It may be noted in FIG. 2 that the positioning of the tabs 47 is not perfectly symmetrical (see the upper right hand and lower right hand tabs in FIG. 2) such that there is only one correct orientation of the support member 43 relative to the shift bar housing 15. One benefit of the selection indication module 41 may be seen by viewing FIGS. 1 and 2, wherein the module 41 has been added to an existing shift bar housing assembly 11, without any change in the overall arrangement or configuration of the assembly. The only change needed in the assembly 11 is to form the recesses which receive the locating tabs 47, and to perform some additional material removal such that the module 41 could be added as a "retro-fit" to transmissions already in use in the field.

The support member 43 defines four stamped-out hangers 49, each of which is formed into a generally L-shape, the hangers 49 collectively restraining and guiding the slide member 45 so that it can engage in relative movement in the X—X direction only.

Referring now primarily to FIG. 2, the support member 43 defines a relatively large rectangular opening 51, which permits unrestricted movement of the shift finger 33 throughout the entire range of its motion in the X—X direction, without the shift finger 33 ever engaging the support member 43. The support member 43 defines a pair of generally H-shaped spring openings 53 and 55, which receive a primary spring 57 and a secondary spring 59, respectively (see FIG. 1). For ease of illustration, the springs 57 and 59 are omitted from FIG. 2, but the upper half of each of the springs 57 and 59 is shown in the overlay views of FIGS. 5 and 7. The openings 53 and 55 are bounded, in part, by pairs of spring retaining tabs 61. It should be noted that, for simplicity of illustration, the tabs 61 are not shown in the axial cross-sections of FIGS. 1, 4, and 6, wherein, in a perfect cross-sectional view, the tabs 61 would appear in front of one or two turns at each end of the springs 57 and 59.

The support member 43 defines spring seats 63 and 65 at opposite ends of the spring opening 53. Similarly, the support member 43 defines spring seats 67 and 69 at opposite ends of the spring opening 55. In each case, it should be noted that the spring seat comprises a pair of surfaces on opposite lateral sides of the respective spring retaining tabs 61.

Figure 2A:
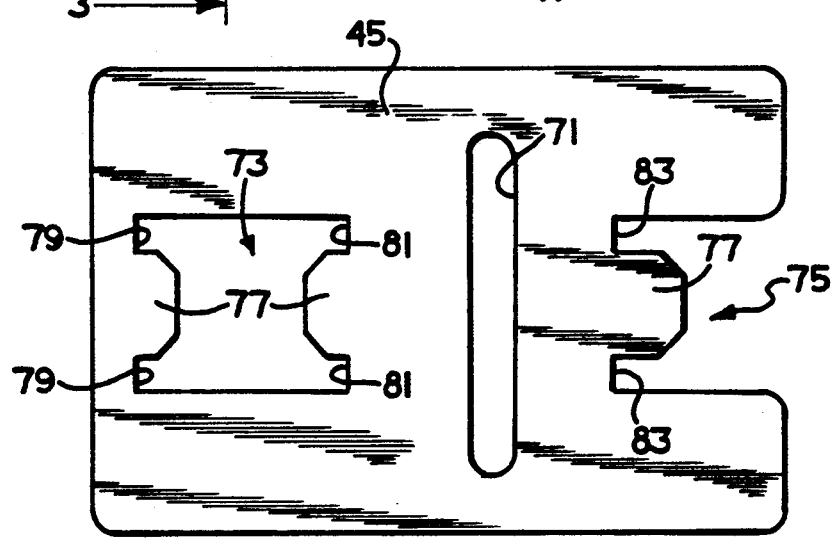
FIG. 2A is a top plan view, similar to FIG. 2, illustrating only the slide member of the shift control mechanism of the present invention.
Figure 3:
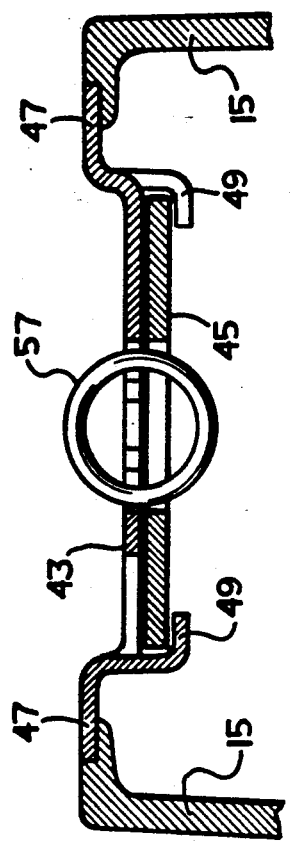
FIG. 3 is a transverse cross-section, taken on line 3—3 of FIG. 2, and on approximately the same scale, but including the compression spring which was omitted from FIG. 2.

Referring now primarily to FIG. 2A, the slide member 45 will be described in some detail. As may be seen in FIGS. 1 and 3, the slide member 45 is preferably a flat, planar member (as opposed to the support member 43, which has the locating tabs 47 and hangers 49 disposed at different levels than the main part of the member 43). The slide member 45 defines a relatively small rectangular opening 71, which preferably receives the shift finger 33 in a relatively close fit relationship. The slide member 45 defines a generally H-shaped spring opening 73, and a spring opening 75, which is somewhat H-shaped, but is open at the right end in FIG. 2A for reasons to be described subsequently. The spring opening 73 is bounded by a pair of spring retaining tabs 77, while the spring opening 75 has a spring-retaining tab 77 at its left end in FIG. 2A.

The slide member 45 defines a pair of spring seats 79 and 81 at opposite axial ends of the spring opening 73. Similarly, the slide member 45 defines a spring seat 83 at the left end of spring opening 75. As was the case in regard to the support member 43, each of the spring seats 79, 81, and 83 actually comprises a pair of surfaces laterally disposed on opposite sides of the respective spring retaining tabs 77. Referring again to FIG. 2, it should be noted that the spring retaining tabs 77 are just slightly larger, laterally, than the respective spring retaining tab 69, which is above each tab 77.

Referring now primarily to FIG. 1, 2, and 2A, it is one important aspect of the present invention that, with the slide member 45 in the neutral position in the X—X direction (i.e., in engagement with the shift rail 21), the spring seats 63 and 79 are aligned, and the spring seats 65 and 81 are aligned. However, as may best be seen in FIG. 2, the spring seats 67 and 83 are not aligned, for reasons which will be described subsequently. As used herein, the term "aligned" means that the respective spring seats are in the same axial position, i.e., in the same position in the X—X direction. As a result, with the slide member 45 in the position shown in FIGS. 1 and 2, the left end of the primary spring 57 engages both spring seats 63 and 79, while the right end of the primary spring 57 engages both spring seats 65 and 81. At the same time, the left end of the secondary spring 59 engages only the spring seat 67, while the right end of the secondary spring 59 engages only the spring seat 69. Preferably, the size of each of the spring openings 53, 55, 73, and 75, relative to the uncompressed length of each of the springs 57 and 59 in such that, even with the slide member 45 in the neutral position of FIGS. 1 and 2, the springs 57 and 59 are both somewhat "loaded", i.e., slightly compressed.

Referring now to the graph of FIG. 8, it may be seen that with the shift finger 31 in the position shown in FIGS. 1 and 1A, the force (resistance) at the shift finger contact point is approximately 45 pounds, although, as the vertical part of the graph indicates, there is a prefectly centered position of the shift finger 33 wherein the net force is effectively zero. Although the spring 57 is "preloaded", the biasing force on the slide member 45 is equal and opposite, thus resulting in a "net" force on the shift finger of zero in the perfectly centered position. However, with any slight movement away from the perfectly centered position, the net force acting on the shift finger rises quickly to about the 45 pounds shown in FIG. 8.

Figure 4A:
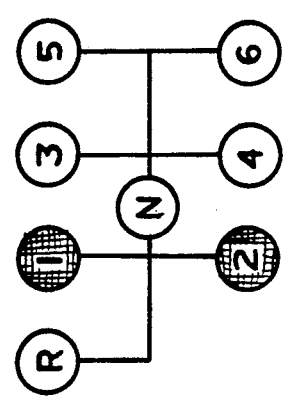
FIG. 4A is a schematic representation of the shift pattern, highlighted to correspond to the shift lever position shown in FIG. 4.
Figure 4:
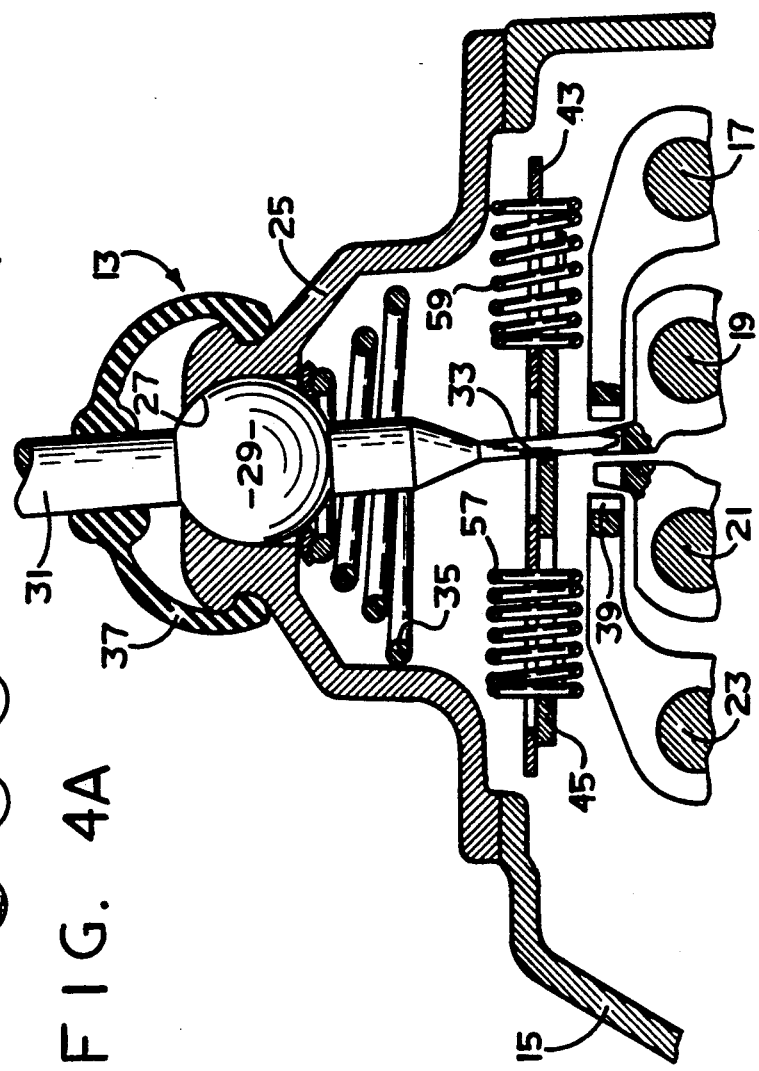
FIG. 4 is an axial cross-section, similar to FIG. 1, illustrating the shift control mechanism of the present invention in its first and second gear position.
Figure 5:
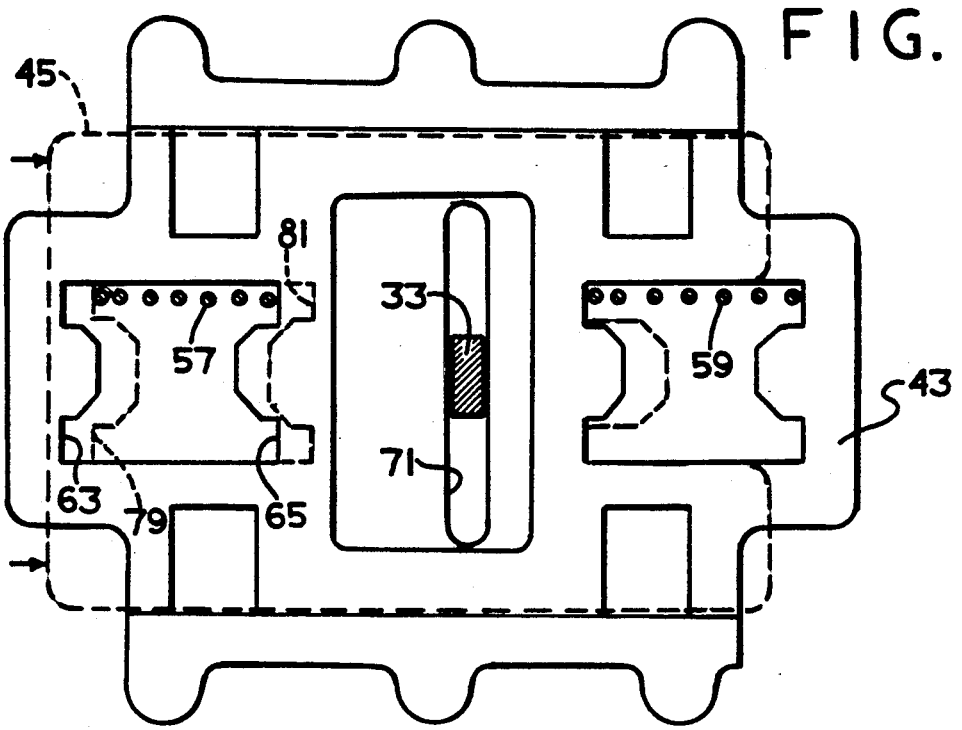
FIG. 5 is an overlay view of the support member and the slide member of the present invention, in a position corresponding to that shown in FIG. 4.

Referring now primarily to FIG. 4, the shift lever 31 has been moved in the X—X direction to a position in which it engages the shift rail 19, i.e., a position in which it would then be possible to shift into either first or second gear, by subsequently moving the shift lever 31 as appropriate in the Y—Y direction. Referring now to FIG. 5, in conjunction with FIG. 4, the slide member 45 has been moved to the right, relative to the support member 43 (see arrows in FIG. 5). Note that in the overlay views of FIGS. 5 and 7, only the upper half of the springs 57 and 59 has been shown, for ease of illustration, it being understood that the springs 57 and 59 are symmetrically positioned within the spring openings (see FIG. 3). As the slide member 45 begins to move from its position shown in FIG. 2 to that shown in FIG. 5, the left end of the primary spring 57 now engages only the spring seat 79, while the right end of the primary spring 57 engages only the spring seat 65, thus slightly increasing the force acting on the shift finger, so that when the shift finger reaches the position shown in FIGS. 4 and 5, the force on the shift finger has reached approximately 55 pounds as shown in FIG. 8. In accordance with one important aspect of the present invention, and as is shown in the graph of FIG. 8, if the shift finger 33 had been moved in the opposite direction, into engagement with the shift rail 23, the force acting on the shift finger would have increased about the same amount, i.e., to about 55 pounds. However, in that case, the left end of the primary spring 57 would have been in engagement with only the spring seat 63, while the right end of the primary spring 57 would have been in engagement with only the spring seat 81, as the slide member 45 moved to the left from the position shown in FIG. 2, relative to the support member 43.

Referring again to FIG. 5, it should be noted that with the shift finger 33 engaging the shift rail 19, the spring seat 83 defined by the slide member 45 has just come into axial alignment with the spring seat 67 defined by the support member 43. As a result, there has not yet been any additional compression of the secondary spring 59, beyond the initial preload.

Figure 7:
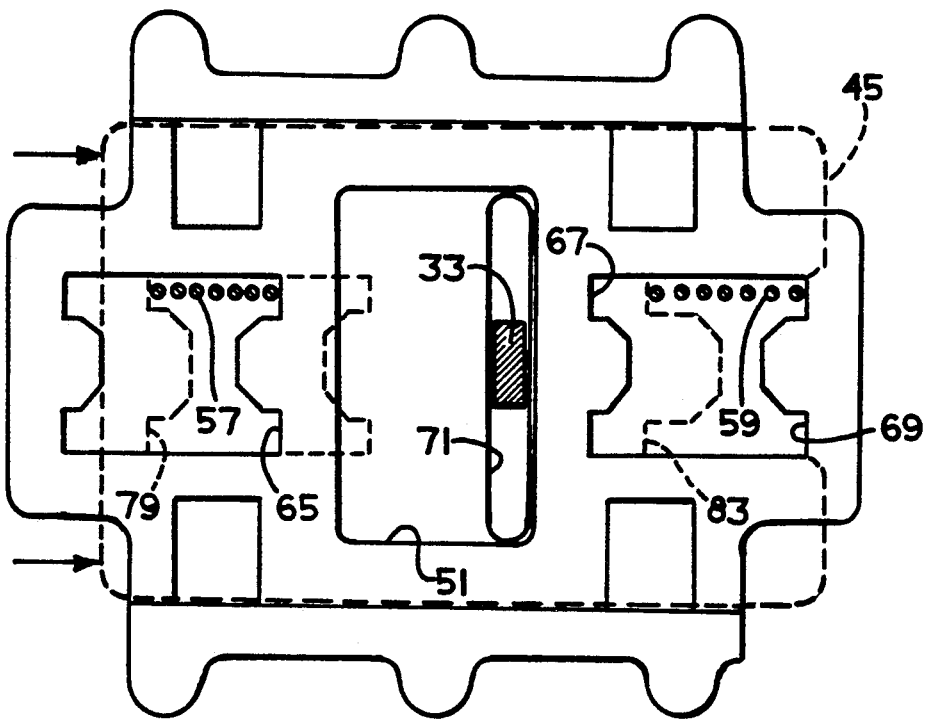
FIG. 7 is an overlay view of the support member and the slide member of the present invention in a position corresponding to that of FIG. 6.

Referring now primarily to FIGS. 6 and 7, the shift lever 31 has been moved even further in the same direction, such that the shift finger 33 is now in engagement with the shift rail 17, whereby it would be possible with subsequent movement of the shift lever 31, as appropriate, in the Y—Y direction, to engage the reverse gear.

Referring now primarily to FIG. 7, it may be seen that the primary spring 57 still has its left and right ends seated against the spring seat 79 and 65, as described in connection with FIG. 5, but now the primary spring 57 is approaching a "bottomed out" condition, although it should be understood that such a condition is never actually reached. Also, it should be noted that the opening 71 does not quite reach the right hand boundary of the opening 51. Therefore, the shift finger 33 preferably never engages the support member 43, but instead, the physical limit on the travel of the shift lever 31 is the engagement of the shift finger 33 against the side of the notch 39, defined by the shift rail 17. At the same time, as the slide member 45 moves from the position shown in FIG. 5 to that shown in FIG. 7 (see the arrows in FIG. 7), the left end of the secondary spring 59 is now seated against only the spring seat 83, while the right end of the secondary spring 59 is still seated against only the spring seat 69. The additional compression of the secondary spring 59, as the slide member moves from the position shown in FIG. 5 to that shown in FIG. 7, has the effect shown in FIG. 8, wherein the graph has a steeper slope in moving from the "¼" position to the "R" position than it did in moving from the "N/¼" position to the "¼" position. This steeper slope results from the fact that the spring 57 is being further loaded or compressed, and the spring 59 is now being compressed between the spring seats 69 and 83, the additional force to overcome the spring 59 providing the "feel" to the vehicle operator, indicating that the shift lever 31 has been moved beyond the "¼" position illustrated in FIGS. 6, 6A, and 7, the primary and secondary springs 57 and 59 are compressed to such an extent that, as shown in the graph of FIG. 8, there is now a force of approximately 175 pounds acting on the shift finger 33.

Thus, it may be seen that the present invention provides a shift rail selection indication module which is effective to provide the vehicle operator with a "feel" at the shift lever such that the operator knows which shift rail is engaged by the force acting on the shift finger. Furthermore, the present invention provides such a module which fits between the shift rails and the shift tower, such that the overall size of the shift control mechanism is not increased, and the configuration of the mechanism is not changed. The module of the present invention achieves the object of being relatively simple and inexpensive to manufacture, in that the preferred embodiment comprises a pair of stampings and a pair of coil springs (which may be substantially identical and comprise the same part number). Finally, the shift rail selection indication module of the present invention is a totally self-contained, self-retained subassembly, which may be assembled (and remains in the position shown in FIGS. 1 and 2 by virtue of the preload on the springs 57 and 59), then subsequently handled, stored, or shipped as a module or subassembly.

Referring again primarily to FIGS. 2 and 2A, the spring opening 75 defined by the slide member 45 is "open", i.e., it defines only a single spring seat 83. However, the spring opening 75 could be "closed", generally in the manner of the spring opening 73, such that it defined an additional spring seat, disposed to the right of the spring seat 69 with the slide member 45 in the position shown in FIG. 2, i.e., as far to the right of the spring seat 69 as the spring seat 83 is to the left of the spring seat 67. In that case, it would be possible for the shift rail selection indication module of the invention, as modified, to be used in a transmission having five shift rails, wherein there would be an additional shift rail to the left of the 5/6 shift rail 23, and engagement of the shift finger 33 with that added shift rail would require the same force on the shift lever as is required to shift into the "R" position. In other words, the graph of FIG. 8 would have an additional position to the right of the "5/6" position, and the entire graph could be substantially symmetrical, relative to the "N¼" position.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A shift control mechanism for use in cooperation with a transmission shift bar housing assembly comprising a shift bar housing mountable to a transmission housing, and a plurality of substantially parallel, generally equal transverse width shift rails mounted for selective axial movement within said shift bar housing, each of said shift rails being operatively connected to shift elements for engaging and disengaging selected transmission gears, each of said shift rails having an axially non-displaced neutral position and an axially displaced in-gear position, each of said shift rails including means adapted for operative engagement with a shift finger associated with a shift lever, whereby movement of said shift lever in the Y—Y direction results in axial movement of one of said shift rails; said shift control mechanism being characterized by:

(a) a support member fixed relative to said shift bar housing and defining first and second spring seats;

(b) a slide member operatively associated with said support member, movable relative thereto, and restrained for movement substantially only in the X—X direction, said slide member defining first and second spring seats;

(c) a first compression spring having its opposite ends seated relative to said first spring seats of said support member and said slide member, respectively;

(d) a second compression spring having its opposite ends seated relative to said second spring seats of said support member and said slide member, respectively;

(e) said first spring seats and said second spring seats being located relative to each other such that:
  (i) when said slide member is in a neutral position, in the X—X direction, said first and second compression springs are at a minimum load;
  (ii) when said slide member is displaced from said neutral position toward a first displaced position, said first compression spring is further loaded; and
  (iii) as said slide member is displaced from said first position toward a second displaced position, said second compression spring is further loaded.

2. A shift control mechanism as claimed in claim 1, characterized by said first compression spring being further loaded as said slide member is displaced from said first displaced position to said second displaced position.

3. A shift control mechanism as claimed in claim 1, characterized by said support member comprising a generally flat member, and said slide member comprising a generally flat member, said support and slide members being disposed in generally face-to-face relationship with each other.

4. A shift control mechanism as claimed in claim 3, characterized by said shift finger being oriented in a direction generally perpendicular to the plane of said support member and said slide member, said shift finger extending through an enlarged opening defined by said support member, into operable engagement with an opening defined by said slide member.

5. A shift control mechanism as claimed in claim 4, characterized by said shift finger terminating in a portion adapted for operable engagement with one of said shift rails, said slide member being disposed between said support member and said shift rails.

6. A shift control mechanism as claimed in claim 3, characterized by said support member defining a first spring opening and a second spring opening, and said slide member defining a first spring opening and a second spring opening, said first spring openings being generally coincidental, and said second spring openings being generally coincidental, when said slide member is in said neutral position.

7. A shift control mechanism as claimed in claim 6, characterized by said first compression spring being disposed in said first spring openings and said second compression spring being disposed in said second spring openings, said first spring seat of said support member bounding said first spring opening in said support member and said first spring seat of said slide member bounding said first spring opening of said slide member; and said spring seat of said support member bounding said second spring opening of said support member and said second spring seat of said slide member bounding said second spring opening of said slide member.

8. A shift control mechanism for use in cooperation with a transmission shift bar housing assembly comprising a shift bar housing mountable to a transmission housing, and a plurality of substantially parallel, generally equal transverse width shift rails mounted for selective axial movement within said shift bar housing, each of said shift rails being operatively connected to shift elements for engaging and disengaging selected transmission gears, each of said shift rails having an axially non-displaced neutral position and an axially displaced in-gear position, each of said shift rails including means adapted for operative engagement with a shift finger associated with a shift lever, whereby movement of said shift lever in the Y—Y direction results in axial movement of one of said shift rails; said shift control mechanism being characterized by:

(a) a support member comprising a generally flat member fixed relative to said shift bar housing and defining a first spring opening including first and second spring seats;

(b) a slide member comprising a generally flat member disposed in generally face-to-face relationship with said support member, movable relative thereto, and restrained for movement substantially only in the X—X direction, and defining a first spring opening including first and second spring seats;

(c) said first spring seat defined by said support member and said second spring seat defined by said slide member being generally coincidental when said slide member is in a neutral position in the X—X direction;

(d) said second spring seat defined by said support member and said first spring seat defined by said slide member being generally coincidental when said slide member is in said neutral position in the X—X direction;

(e) first compression spring means disposed in said first spring openings defined by said support member and said slide member; whereby:

(i) movement of said slide member in a first direction from said neutral position, to a first position, results in said first spring means being compressed between said first spring seats of said support member and said slide member; and (ii) movement of said slide member in a second direction, opposite said first position results in said first spring means being compressed between said second spring seats of said support member and said slide member.

9. A shift control mechanism as claimed in claim 8, characterized by said support member defining a third spring seat and said slide member defining a third spring seat; second compression spring means disposed in operable engagement with said third spring seats, said third spring seats being located relative to each other such that said second spring means is compressed between said third spring seats only after said slide member has been moved in said first direction, beyond said first position.

10. A shift control mechanism as claimed in claim 8, characterized by said first spring opening defined by said support member and said first spring opening defined by said slide member being generally coincidental, when said slide member is in said neutral position.

11. A shift control mechanism as claimed in claim 8, characterized by said shift finger being oriented in a direction generally perpendicular to the plane of said support member and said slide member, said shift finger extending through an enlarged opening defined by said support member, into operable engagement with an opening defined by said slide member.

12. A shift control mechanism as claimed in claim 11, characterized by said shift finger terminating in a portion adapted for operable engagement with one of said shift rails, said slide member being disposed between said support member and said shift rails.

* * * * *